(12) United States Patent
Milde, Jr.

(10) Patent No.: US 8,919,024 B2
(45) Date of Patent: *Dec. 30, 2014

(54) SECURE SMARTPHONE-OPERATED GUN TRIGGER LOCK

(71) Applicant: Karl F. Milde, Jr., Mahopac, NY (US)

(72) Inventor: Karl F. Milde, Jr., Mahopac, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/017,666

(22) Filed: Sep. 4, 2013

(65) Prior Publication Data

US 2014/0215882 A1    Aug. 7, 2014

Related U.S. Application Data

(63) Continuation-in-part of application No. 13/763,951, filed on Feb. 11, 2013, now Pat. No. 8,893,420.

(60) Provisional application No. 61/761,270, filed on Feb. 6, 2013, provisional application No. 61/841,559, filed on Jul. 1, 2013.

(51) Int. Cl.
| | |
|---|---|
| *F41A 17/06* | (2006.01) |
| *F41A 17/46* | (2006.01) |
| *F41A 17/54* | (2006.01) |

(52) U.S. Cl.
CPC .............. *F41A 17/066* (2013.01); *F41A 17/54* (2013.01)
USPC ........ 42/70.06; 42/70.01; 42/70.07; 42/70.11

(58) Field of Classification Search
CPC ....... F41A 17/46; F41A 17/06; F41A 17/063; F41A 17/066
USPC ......................... 42/70.01, 70.07, 70.11, 70.06
See application file for complete search history.

(56) References Cited

U.S. PATENT DOCUMENTS

| | | | | |
|---|---|---|---|---|
| 4,354,189 A | * | 10/1982 | Lemelson | 340/5.61 |
| 4,467,545 A | * | 8/1984 | Shaw, Jr. | 42/70.01 |
| 4,682,435 A | * | 7/1987 | Heltzel | 42/70.01 |
| 4,970,819 A | * | 11/1990 | Mayhak | 42/70.01 |
| 5,062,232 A | * | 11/1991 | Eppler | 42/70.11 |
| 5,448,847 A | * | 9/1995 | Teetzel | 42/70.11 |
| 5,459,957 A | * | 10/1995 | Winer | 42/70.11 |
| 5,461,812 A | * | 10/1995 | Bennett | 42/70.11 |
| 5,502,915 A | * | 4/1996 | Mendelsohn et al. | 42/70.11 |
| 5,570,528 A | * | 11/1996 | Teetzel | 42/70.11 |

(Continued)

FOREIGN PATENT DOCUMENTS

WO    2008151402 A2    12/2008

*Primary Examiner* — Bret Hayes
*Assistant Examiner* — Derrick Morgan
(74) *Attorney, Agent, or Firm* — Karl F. Milde, Jr.

(57) ABSTRACT

A gun trigger-looking device which is configured to be manually installed on a gun with a trigger-blocking member disposed behind the trigger to prevent the gun from being fired. The device includes a data receiver, a data memory and a logic device for determining whether data received by the receiver is the same as data stored in the memory. If a data match is indicated, the logic device causes an electromagnetic device to move a locking member to an unlocked position, permitting the trigger-blocking member to be manually removed from the gun so the gun can be fired. A separate electronic key is provided to transmit unlock data to the data receiver of the trigger-locking device. This unlock data may be a password, a long pseudo-random number or biologic data identifying the gun owner or some other person who is licensed or otherwise authorized to fire the gun.

12 Claims, 2 Drawing Sheets

(56) References Cited

U.S. PATENT DOCUMENTS

| | | | |
|---|---|---|---|
| 5,603,180 A * | 2/1997 | Houze | 42/70.11 |
| 5,636,464 A * | 6/1997 | Ciluffo | 42/70.11 |
| 5,713,149 A | 2/1998 | Cady et al. | |
| 5,896,691 A * | 4/1999 | Kaminski et al. | 42/70.11 |
| 5,915,936 A | 6/1999 | Brentzel | |
| 5,937,557 A * | 8/1999 | Bowker et al. | 42/70.01 |
| 6,237,271 B1 | 5/2001 | Kaminski | |
| 6,260,300 B1 | 7/2001 | Klebes et al. | |
| 6,293,039 B1 * | 9/2001 | Fuchs | 42/70.11 |
| 6,301,815 B1 | 10/2001 | Sliwa | |
| 6,314,671 B1 * | 11/2001 | Gering | 42/70.11 |
| 6,321,478 B1 | 11/2001 | Klebes | |
| 6,412,207 B1 | 7/2002 | Crye et al. | |
| 6,415,542 B1 * | 7/2002 | Bates et al. | 42/70.11 |
| 6,421,943 B1 * | 7/2002 | Caulfield et al. | 42/70.11 |
| 6,429,769 B1 | 8/2002 | Fulgueira | |
| 6,711,843 B2 * | 3/2004 | Klebes | 42/70.11 |
| 6,711,844 B2 * | 3/2004 | Rumfelt | 42/70.11 |
| 6,763,126 B2 * | 7/2004 | Recce | 382/120 |
| 6,785,995 B2 * | 9/2004 | Herzog et al. | 42/70.07 |
| 6,823,621 B2 * | 11/2004 | Gotfried | 42/70.06 |
| 6,861,944 B1 * | 3/2005 | Hoepelman | 340/5.1 |
| 7,030,729 B2 * | 4/2006 | Albanesi et al. | 340/5.61 |
| 7,339,456 B1 * | 3/2008 | Buckley et al. | 340/5.51 |
| 7,353,632 B2 | 4/2008 | Newkirk et al. | |
| 7,356,959 B2 | 4/2008 | Schmitter et al. | |
| 7,770,316 B2 | 8/2010 | Meyerle | |
| 8,205,372 B2 * | 6/2012 | Anzeloni | 42/70.01 |
| 2001/0032405 A1 * | 10/2001 | Kaminski | 42/70.05 |
| 2001/0042332 A1 * | 11/2001 | Gering et al. | 42/70.08 |
| 2002/0157296 A1 * | 10/2002 | Vivian et al. | 42/70.11 |
| 2002/0170219 A1 | 11/2002 | Martin | |
| 2002/0174587 A1 * | 11/2002 | Rumfelt | 42/70.07 |
| 2004/0244253 A1 * | 12/2004 | Glock | 42/70.11 |
| 2007/0074438 A1 * | 4/2007 | Parhofer et al. | 42/70.01 |
| 2008/0039962 A1 * | 2/2008 | McRae | 700/90 |
| 2008/0134556 A1 * | 6/2008 | Remelin | 42/70.07 |
| 2008/0244699 A1 * | 10/2008 | Parhofer et al. | 726/2 |
| 2009/0223104 A1 * | 9/2009 | Anzeloni | 42/70.06 |
| 2010/0263253 A1 | 10/2010 | Giebel et al. | |
| 2011/0061280 A1 * | 3/2011 | Emde et al. | 42/70.06 |
| 2011/0173869 A1 * | 7/2011 | Uhm | 42/111 |
| 2012/0151814 A1 | 6/2012 | Dietel | |
| 2012/0180357 A1 | 7/2012 | Dietel et al. | |
| 2013/0125441 A1 * | 5/2013 | Westwood et al. | 42/70.05 |
| 2013/0312306 A1 * | 11/2013 | Ruffin | 42/70.07 |
| 2013/0318847 A1 | 12/2013 | Kelly | |
| 2014/0150316 A1 * | 6/2014 | Acarreta | 42/70.06 |
| 2014/0215881 A1 * | 8/2014 | Milde et al. | 42/70.06 |
| 2014/0215882 A1 * | 8/2014 | Milde, Jr. | 42/70.06 |
| 2014/0215883 A1 * | 8/2014 | Milde, Jr. | 42/70.11 |
| 2014/0215885 A1 * | 8/2014 | Sullivan et al. | 42/84 |
| 2014/0226879 A1 * | 8/2014 | Westerman et al. | 382/125 |
| 2014/0230301 A1 * | 8/2014 | Chance et al. | 42/70.06 |
| 2014/0283012 A1 * | 9/2014 | Eggerton et al. | 726/19 |
| 2014/0286546 A1 * | 9/2014 | Shin et al. | 382/124 |
| 2014/0289534 A1 * | 9/2014 | Parry et al. | 713/186 |
| 2014/0307929 A1 * | 10/2014 | Nechyba et al. | 382/118 |

\* cited by examiner

SECURE SMARTPHONE-OPERATED GUN TRIGGER LOCK

CROSS-REFERENCE TO RELATED APPLICATIONS

This application claims priority from Provisional Application No. 61/761,270 filed Feb. 6, 2013, and patent application Ser. No. 13/763,951 filed, Feb. 11, 2013, both entitled "SECURE SMARTPHONE-OPERATED GUN TRIGGER LOCK" and Provisional Application No, 61/841,559 filed Jul. 1, 2013, entitled "SECURE SMARTPHONE-OPERATED GUN LOCK."

BACKGROUND OF THE INVENTION

The present invention relates to a gun lock for a trigger-operated gun which is designed to be installed on the gun in a position behind the trigger to prevent the trigger from firing the gun.

Mechanical gun looks are designed to be installed on the gun in a position behind the trigger to prevent the trigger from firing the gun. These gun locks use a mechanical key that can be easily duplicated, and the locks themselves can be compromised by means of a master key or a lock pick.

Furthermore, such gun looks can be opened by anyone in possession of one of the keys. With such gun locks it is not possible to restrict the use of the gun to the gun owner or to some other person who is licensed or otherwise authorized to use the gun.

SUMMARY OF THE INVENTION

It is a principal object of the present invention to provide a gun lock for a trigger-operated gun which is difficult to compromise and allows only the gun owner, or soma other parson who is licensed or otherwise authorized to use the gun.

This object, as well as other objects which will become apparent from the discussion that follows, is achieved, in accordance with the present invention, by providing a trigger-looking device which is configured to be applied to and locked on a gun behind the trigger to prevent the gun from firing. The trigger-locking device includes a data receiver, a data memory and a logic device for determining whether data received by the receiver is the same, or substantially the same, as data stored in the memory. If a data match is indicated, the logic device causes an electromagnetic device to unlock the trigger-locking device allowing it to be removed from the gun, thus permitting the gun to be fired.

According to a preferred embodiment of the invention, the gun lock device further comprises an "electronic key" having a data transmitter for transmitting gun unlock data to the data receiver of the trigger-locking device. This gun unlock data may be a password, a long pseudo-random (and therefore nearly hack-proof) number or biologic data identifying the gun owner or some other person who is licensed or otherwise authorized to use the gun.

More particularly, the trigger-locking device includes:
(a) a trigger-blocking member configured to be manually installed on the gun in a position behind the trigger to prevent the gun from firing;
(b) a locking member, associated with the trigger-blocking member and movable between a locked position which prevents the trigger-blocking member from being removed from the gun and an unlocked position which enables the trigger-blocking member to be manually removed from behind the trigger;
(c) an electromechanical device disposed on the trigger-locking device and coupled to the locking member for moving the locking member from a locked position to an unlocked position in response to at least one electric signal;
(d) a data receiver for receiving a gun unlock signal with gun unlock data;
(e) a data memory for storing data; and
(f) a first logic device, coupled to the data receiver and to the data memory, for comparing said gun unlock data received by the receiver with data stored in the memory upon receipt of the gun unlock signal, and for producing the at least one electric signal to actuate the electromechanical device and move the locking member to the unlock position when the stored data and the received data are substantially the same.

The first logic device is thus operative in this trigger-locking device to cause the electromechanical device to;
move the locking member to the unlocked position when the gun unlock data received by the receiver is substantially the same as the data stored in the memory, and
maintain the locking member in the looked position at all other times, thereby to prevent unauthorized operation of the gun.

Optionally, the data receiver is further operative to receive a gun lock signal and the first logic device, upon receipt of the gun lock signal, is operative to cause the electromagnetic device to move the locking member to the locked position.

The first logic device, upon producing the electric signal, may cause the electromagnetic device to move the looking member to the unlocked position for a first duration of time, and thereafter to move the locking member back to the locked position. The first duration of time is preferably selected from the group consisting of:
(i) less than 1 minute;
(ii) a range of time from 1 minute to 5 minutes;
(iii) a range of time from more than 5 minutes to 30 minutes; and
(iv) more than 30 minutes, In an alternative embodiment of the invention, the locking member, after being moved to the unlocked position remains in that position until a gun lock signal is received by the data receiver or the trigger-locking device is manually locked.

According to the invention the electronic key has a data transmitter for transmitting gun unlock data to the data receiver in the trigger-locking device. As mentioned above, the gun unlock data may include a password, a pseudo-random number or data identifying a putative authorized person who wishes to use the gun. The pseudo-random number is preferably generated by the electronic key when the trigger-locking device is first used.

According to a preferred embodiment of the invention, the electronic key comprises:
(a) an input device, for inputting information from a putative authorized person who wishes to unlock the trigger-locking device; and
(b) a second logic device, coupled to both the data transmitter and the input device, for generating unlock data defined by the putative authorized person and for causing the data transmitter to transmit the unlock data to the data receiver. The putative authorized person is recognized as an authorized person if the unlock data substantially matches the stored data in the data memory of the trigger-locking device.

When a biologic identifier is used to unlock the trigger-locking device, the data stored in its memory may include at least one biologic identifier of the owner or an authorized person.

The input device of the electronic key may be a camera, for example. In this case, the camera is operative to record an image of the putative authorized person as a biologic identifier, which image may be:
- a facial image;
- an image of an iris;
- a retinal image;
- a fingerprint;
- a palm print; and
- an image of veins of a hand;

The second logic device is then operative to process the image and to generate the unlock data therefrom.

Alternatively, the input device may be a microphone. The second logic device is then operative to process a voiceprint of the putative authorized person as a biologic identifier and to generate the unlock data therefrom.

Finally, the input device may be an alphanumeric keyboard, whereby:
(i) the putative authorized parson may input an alphanumeric code; and
(ii) the putative authorized person is recognized as an authorized person in the event of the inputted code matching the stored data.

The trigger-locking device preferably comprises a first battery for providing power to at least one of the logic device, the data receiver and the data memory and a second battery for providing power to the electromechanical device which is power thirsty compared to the electronic devices.

Preferably, an electric device is provided for selectively utilizing the still-functional battery when one of the two batteries is depleted.

Preferably also, the electromechanical device is operative to move the locking member to the first position in the event of battery depletion.

Advantageously, the data memory comprises at least one write-once-only element to prevent degradation of the data stored in the memory and to prevent the data stored in the memory from being changed. The write-once-only element may be a PROM, an EPROM or an EEPROM, for example.

According to a preferred embodiment of the invention, the trigger-locking device comprises at least one tamper detecting device, situated in proximity to the trigger, for detecting external manipulation of at least one of (1) the logic device, the (2) electromechanical apparatus, and (3) the locking member. This tamper detecting device preferably generates a tamper signal upon the detection of the external manipulation, which tamper signal causes the electromechanical device to maintain the locking member in the locked position for a second duration of time. The tamper detecting device may be a separate element or it may be implemented by the first logic device.

Advantageously, the trigger-locking device comprises a transmitting device, coupled to the tamper detecting device, for transmitting an alarm upon generation of the tamper signal.

According to still another preferred embodiment of the present invention, the data memory may be operative to store identifying information of a registration person authorized to input data to the data memory which identifies the authorized person. In this case, the first logic device is made operative to store data concerning a person authorized to use the gun, in the data memory only if the authorized person identification information is accompanied by identification of a putative registration person that substantially matches the stored registration person identification information. Also, the first logic device is made operative to change the data stored in the data memory only if the identification information is accompanied by identification of a putative registration person that substantially matches the stored registration person identification information.

Finally, according to still another preferred embodiment of the present invention, the electromechanical device includes an electric motor coupled to a gear reduction mechanism for rotating a cam. The movable member of the trigger-looking device is moved by the cam between the locked position and the unlocked position.

Alternatively, the electric motor may be a servo-motor which is coupled mechanically to the movable member to move this member back and forth between the two positions.

In yet another alternative embodiment of the invention, an electromagnetically controlled two-position switching device may be used to control the position of the locking member.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
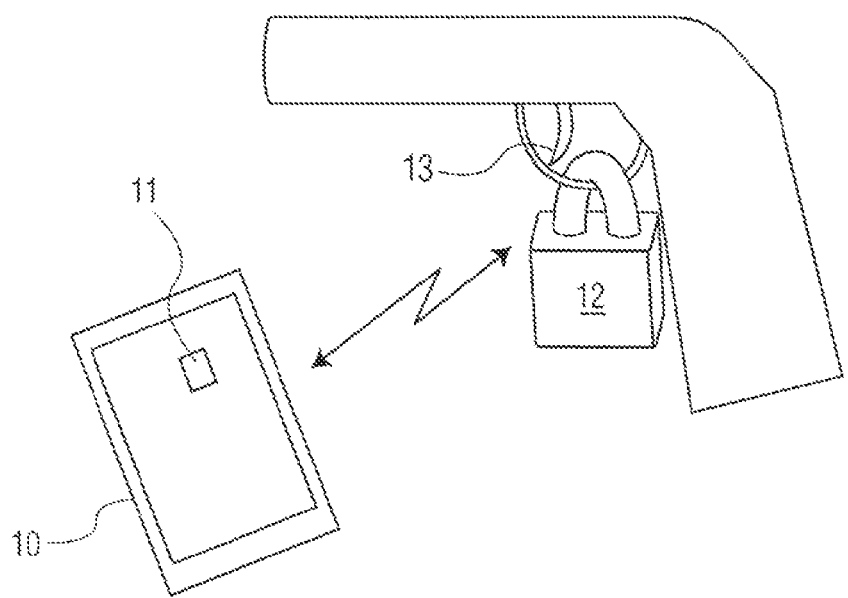
FIG. 1 is a representational diagram showing a smartphone and a gun that is equipped with a trigger-locking device according to the present invention.

The preferred embodiments of the present invention will now be described with reference to FIGS. 1-3 of the drawings. Identical elements in the various figures ere identified with the same reference numerals.

Briefly in overview, a trigger-locking device is designed to be manually installed on a gun in the recess behind the trigger in the lower receiver mechanism, blocking rearward movement of the trigger. When installed and locked, the trigger-locking device cannot be unlocked without the use of an "electronic key" which is described below. When a proper electronic signature is transmitted to the trigger-locking device by the electronic key, a movable member within the trigger-locking device is moved to an unlocked position, allowing the device to be opened and manually removed from the gun.

The trigger-locking device has a Bluetooth receiver (or some other type of signal receiver) and a stored number. When this particular number is received from a smartphone or similar device, the trigger-locking device is unlocked and can be removed from a gun.

FIG. 1 illustrates this configuration. A smartphone 10 has an App 11 called "Gunlock" that presents a button called "Gun Unlock." By pressing this button on the App, the operator sends a password, a pseudo-random number or biologic ID data by a wireless transmission to a trigger-locking device 12 that has been manually installed on a gun behind the trigger 13, preventing the gun from being fired. If the data sent to the trigger locking device matches the data stored in its memory, the trigger-locking device can be unlocked and removed from the gun. The trigger-locking device is therefore similar to, and can be called, an "electronic padlock" openable only upon receipt of a proper signal.

Figure 2:
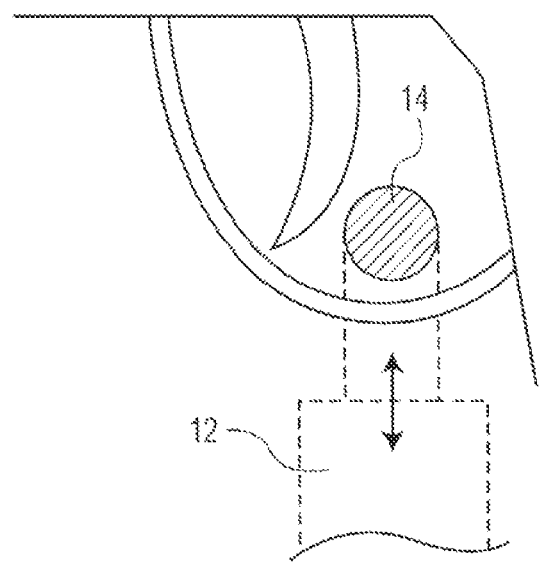
FIG. 2 is a close-tap view of the trigger region of the gun of FIG. 1 with the trigger-locking device installed.

FIG. 2 shows the trigger-locking device 12 with a locking member 14. When the device receives a data packet that matches the corresponding data stored in its memory, it shifts the position of a movable member (inside the device 12), allowing the trigger-locking device to be opened and removed from the gun, allowing the gun to be fired.

The smartphone can be made secure in any number of ways. It can be password protected or, preferably, it can use of its camera to verify the ID of the person holding this device. For example, the security App may use face recognition or iris recognition software to identify the owner from the camera image.

When the trigger-locking device 12 is first used, the Gunlock App can generate a pseudo-random number and send it to the trigger-locking device for storage in its permanent memory. Once stored, this number can be changed only by an authorized person, such as the gun owner, or a "registration person" who is licensed to make changes in the data stored in memory. Thereafter, whenever the smartphone sends this number again, the trigger-locking device is released and can be removed from the gun, allowing the gun to be fired. Before sending the unlock number, the user of the smartphone may be required to identify himself/herself by entering biologic identifying information into the phone for a recognition algorithm. Alternatively, the biologic ID information may be sent to the trigger-locking device for matching with corresponding biologic identifying data stored therein.

Firing the gun is therefore a three-step process for the gun owner or authorized user:

(1) Verify his/her identity with the smartphone; and
(2) Press the Gun Unlock button to release the trigger locking device; and
(3) Remove the trigger-locking device from the gun.

The trigger remains unlocked until the gun user presses another button on the Gunlock app, appropriately called "Gun Lock," or until the trigger-locking device times out and automatically locks itself again by restoring the movable member to the locked position.

The trigger-looking device 12 may be powered by a replaceable and/or rechargeable battery (not shown) or, in accordance with a particular feature of the invention, it may be powered by the transmitted signal or by a separate coil which receives power from the smartphone or other device by magnetic induction.

Figure 3:
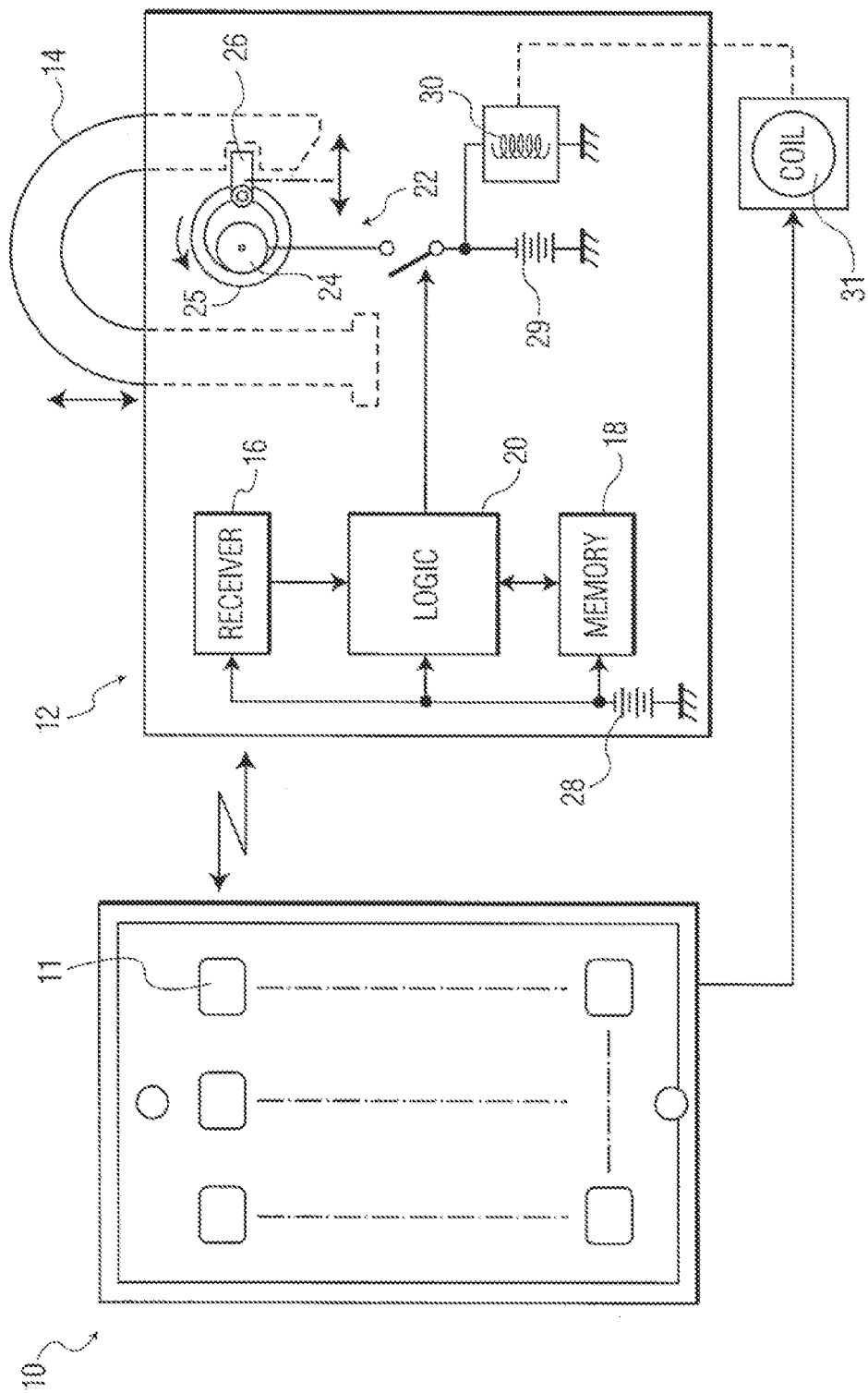
FIG. 3 is a block diagram of the electronic and electromagnetic devices in the trigger-locking device.

FIG. 3 shows the individual elements of the gun lock apparatus. The smartphone 10 transmits to a receiver 16 in the trigger-locking device 12, preferably via a wireless Bluetooth connection. Alternatively, the smartphone may be coupled to the receiver by a wire connection, for example through a USB port. The receiver 18 and a data memory 18 are both coupled to a logic device 20 that compares the data received from both the receiver and the memory and sends an electric signal to an electromechanical device 22 when and if there is a match.

If biologic ID data has been sent to the receiver by the smartphone 10, the data may not be an exact match; however, the received signature data may be sufficiently close to the previously stored bio-ID data to satisfy the requirement that the person holding the smartphone is indeed the owner of the gun.

The electromechanical device 22 preferably includes a micro-motor 24 that turns a cam 25 through a speed reduction gear mechanism. In this way, a very small motor may generate sufficient torque to move the movable member 26 from its locked position to the unlocked position thus permitting the trigger-locking device to be removed from the gun. The relatively large forces that may be required to shift the movable member 26 from the locked position to the unlocked position are taken up by the cam 25. Upon rotation it moves the movable member 26 toward the unlocked position allowing the locking member to be lifted up and opened in the manner of a padlock, so that the trigger-locking device can be removed from a gun.

The electronic circuits 16, 18 and 20 are powered by a battery 28; the electromechanical device 22 is preferably powered by a separate, larger battery 29. Preferably, at least the larger battery 29 is rechargeable, either directly by a wire connection or indirectly by magnetic induction via induction coils 30 and 31.

There has thus been shown and described a novel secure smartphone-operated gun trigger lock which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Gun lock apparatus for preventing use of a trigger-operated gun by any unauthorized person, said gun lock apparatus comprising, in combination:

(1) a trigger-locking device configured to be manually installed on a gun to block a trigger of the gun from firing the gun, said trigger-locking device including:
  (a) a trigger-blocking member configured to be manually installed on the gun in a position behind the trigger to prevent the gun from firing;
  (b) a movable locking member, associated with the trigger-blocking member and movable between a locked position which prevents the trigger-blocking member from being removed from the position behind the trigger of the gun and an unlocked position which enables the trigger-blocking member to be manually removed from the position behind the trigger;
  (c) an electromechanical device coupled to the locking member for moving the locking member between a locked position to an unlocked position in response to at least one electric signal;
  (d) a data receiver for receiving a gun unlock signal containing biologic identifying data;
  (e) a data memory for storing data including biologic identifying data identifying a person authorized to use the gun; and
  (f) a first logic device, coupled to the data receiver and to the data memory, for comparing said biologic identifying data contained in said gun unlock signal with biologic identifying data stored in the data memory upon receipt of the gun unlock signal, and for producing the at least one electric signal to cause the electromechanical device to move the locking member to the unlock position when the stored data and the received data are substantially the same;

(2) an electronic key device, separate from the gun, having a data transmitter for transmitting the gun unlock signal to said data receiver in said trigger-locking device, said electronic key device including:
  (a) an input device comprising a camera for inputting biologic identifying information from a putative authorized person who wishes to unlock the gun; and
  (b) a second logic device, coupled to each of said data transmitter and said input device, for generating the gun unlock signal containing biologic identifying data identifying said putative authorized person and for causing said data transmitter to transmit said gun unlock signal to said data receiver;

whereby said putative authorized person is recognized as an authorized person and the trigger locking device may be removed from the gun when said biologic identifying data contained in said gun unlock signal matches said biologic identifying data stored in the data memory, thereby to permit authorized operation but prevent unauthorized operation of the gun.

2. The gun lock apparatus of claim 1, wherein said gun unlock signal includes a pseudo-random number.

3. The gun lock apparatus of claim 1, wherein:
(1) said data receiver is further operative to receive a gun lock signal from said electronic key device; and
(2) said first logic device, upon receipt of said gun lock signal, is operative to use said electromagnetic apparatus to move said movable locking member to said licked position.

4. The gun lock apparatus of claim 1, wherein said first logic causes said electromagnetic device to move said movable member to said unlocked position for a first duration of time and thereafter to move said movable member to said locked position.

5. The gun lock apparatus of claim 4, wherein said first duration of time is selected from the group consisting of:
(i) less than 1 minute;
(ii) a range of time from 1 minute to 5 minutes;
(iii) a range of time from more than 5 minutes to 30 minutes; and
(iv) more than 30 minutes.

6. The gun lock apparatus of claim 1, wherein said gun unlock signal includes a pseudo-random number generated by said electronic key device.

7. The gun lock apparatus of claim 1, wherein said camera is operative to record an image of said putative authorized person as a biologic identifier,
said image being selected from the group consisting of:
a facial image;
an image of an iris;
a retinal image;
a fingerprint;
a palm print; and
an image of veins of a hand; and
wherein said second logic device is operative to process said image and to generate said gun unlock signal therefrom.

8. The gun look apparatus of claim 1, wherein said input device is a microphone, and wherein said second logic device is operative to process a voiceprint of the putative authorized person as a biologic identifier and to generate said gun unlock signal therefrom.

9. The gun lock apparatus claim 1, wherein said trigger-locking device further comprises a first battery for providing power to at least one of said logic device, said data receiver and said data memory.

10. The gun look apparatus of claim 9, wherein said trigger-locking device further comprises a second battery for providing power to said electromechanical device.

11. The gun lock apparatus of claim 10, wherein said electromechanical de is further operative to move said movable member to said unlocked position in the event of battery depletion.

12. The gun lock device of claim 1, wherein said trigger-locking device includes a rechargeable battery for powering said electromechanical device and a magnetic coil coupled thereto, for receiving power by magnetic induction.

* * * * *